US011005279B2

(12) United States Patent
Miller et al.

(10) Patent No.: US 11,005,279 B2
(45) Date of Patent: May 11, 2021

(54) COMPACT PORTABLE BATTERY CHARGER

(71) Applicant: HALO2CLOUD, LLC, Glastonbury, CT (US)

(72) Inventors: Garold C. Miller, Glastonbury, CT (US); Nathan Daniel Weinstein, Glastonbury, CT (US)

(73) Assignee: HALO2CLOUD, LLC, Hartford, CT (US)

( * ) Notice: Subject to any disclaimer, the term of this patent is extended or adjusted under 35 U.S.C. 154(b) by 798 days.

(21) Appl. No.: 13/833,838

(22) Filed: Mar. 15, 2013

(65) Prior Publication Data
US 2014/0152257 A1 Jun. 5, 2014

Related U.S. Application Data

(60) Provisional application No. 61/732,657, filed on Dec. 3, 2012.

(51) Int. Cl.
*H02J 7/00* (2006.01)

(52) U.S. Cl.
CPC .............. *H02J 7/0042* (2013.01); *H02J 7/00* (2013.01); *H02J 2207/30* (2020.01); *H02J 2207/40* (2020.01)

(58) Field of Classification Search
CPC ..................................... H02J 7/0042
USPC ....................................... 320/111
See application file for complete search history.

(56) References Cited

U.S. PATENT DOCUMENTS

| | | | |
|---|---|---|---|
| 5,829,993 A | 11/1998 | Wu | |
| 5,847,545 A * | 12/1998 | Chen et al. | 320/138 |
| 5,901,056 A * | 5/1999 | Hung | H02J 7/0063 363/142 |
| 5,967,807 A * | 10/1999 | Wu | H01R 29/00 439/131 |
| D456,349 S * | 4/2002 | Chuang | D13/107 |
| 6,528,970 B1 | 3/2003 | Liu et al. | |
| 6,551,142 B2 | 4/2003 | Eisenbraun | |
| 6,612,875 B1 | 9/2003 | Liao | |
| 6,894,457 B2 | 5/2005 | Germagian et al. | |
| D543,940 S | 6/2007 | Hussaini et al. | |

(Continued)

OTHER PUBLICATIONS

International Search Report for PCT/US2013/072749 dated Mar. 24, 2014.

*Primary Examiner* — Robert Grant
(74) *Attorney, Agent, or Firm* — Lathrop GPM LLP

(57) ABSTRACT

A compact portable power charger having an internal rechargeable battery is provided with a wall plug interface and a car charger interface selectively and independently connected to the charger as power input interfaces for recharging the internal battery when the charger is connected to respective external power sources via the interfaces. Each interface is pivotably movable between an extended position where the interface projects outwardly away from the charger housing for use and a retracted position for storage of the interface within a respective cavity formed in the charger housing. The charger further includes a power output interface, such as a power connection port, operatively connected to the internal battery for providing an electrical charge from the internal battery to an electronic device when the electronic device is connected to the charger via the power output interface.

15 Claims, 7 Drawing Sheets

(56) References Cited

U.S. PATENT DOCUMENTS

| | | | |
|---|---|---|---|
| D554,585 S | 11/2007 | Nazar | |
| D574,833 S * | 8/2008 | Hussaini | D13/107 |
| 7,438,574 B2 * | 10/2008 | Neumann | H01R 13/4532 439/172 |
| D585,825 S * | 2/2009 | Ji | D13/108 |
| D594,817 S | 6/2009 | Abdallah et al. | |
| D610,094 S * | 2/2010 | Ouimette | D13/144 |
| D616,363 S * | 5/2010 | Weng | D13/107 |
| D628,152 S * | 11/2010 | Fujii | D13/108 |
| D633,436 S | 3/2011 | Griffin, Jr. | |
| D636,725 S * | 4/2011 | Levy | D13/108 |
| 7,942,691 B1 | 5/2011 | McSweyn | |
| D641,695 S * | 7/2011 | Wegener | D13/108 |
| D675,988 S | 2/2013 | Levy et al. | |
| D682,202 S * | 5/2013 | Weaver, Jr. | D13/108 |
| 8,491,317 B2 * | 7/2013 | Vardanyan | H01R 27/00 363/142 |
| 2004/0085694 A1 | 5/2004 | Germagian et al. | |
| 2005/0009404 A1 | 1/2005 | Lee | |
| 2007/0126290 A1 * | 6/2007 | Jaynes | H02J 7/0044 307/150 |
| 2007/0247105 A1 * | 10/2007 | Krieger et al. | 320/104 |
| 2007/0273325 A1 * | 11/2007 | Krieger | H01M 2/1027 320/106 |
| 2008/0284371 A1 | 11/2008 | Hsu | |
| 2009/0167241 A1 * | 7/2009 | Lee | H02J 7/0045 320/111 |
| 2009/0267562 A1 * | 10/2009 | Guccione | H02J 7/0054 320/114 |
| 2010/0202137 A1 * | 8/2010 | Dalton et al. | 362/183 |
| 2010/0231165 A1 * | 9/2010 | Griffin, Jr. | H01M 10/46 320/112 |
| 2012/0166697 A1 | 6/2012 | Hu et al. | |
| 2012/0238132 A1 | 9/2012 | McSweyn | |

\* cited by examiner

COMPACT PORTABLE BATTERY CHARGER

CROSS REFERENCE TO PRIOR APPLICATION

This application claims the benefit of U.S. Provisional Application No. 61/732,657, filed Dec. 3, 2012, which is incorporated herein by reference.

FIELD OF INVENTION

The present invention generally relates to chargers for electronic devices, and more particularly relates to a compact portable battery charger with which a user can charge an electronic device directly from a standard power source, such as a wall socket, a car charger socket, or an airline charger socket, or on-the-go from a portable and rechargeable power source disposed within the charger.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet like an iPad®, a portable gaming unit, a digital camera or camcorder, and the like. Each of these devices requires frequent recharging. Such electronic devices typically utilize a power cord or cable for connecting the device to a power source, such as a wall outlet, a car charger, an airplane charger, or a computer. However, a separate cable is usually required for each power source. Moreover, during recharging, the device must remain attached to the power source via the cable, which makes on-the-go use of the device difficult, as the user is tethered to one spot. When the device is disconnected from the power source or the cable, charging stops. This can be inconvenient if the device has not been sufficiently recharged for intended use away from a power source.

For example, when a phone is plugged into a car charger socket (e.g., a cigarette lighter socket) for recharging, the phone usually can still be used to make and receive calls. However, if the user wants or needs to disconnect the phone from the car charger socket for any reason—e.g., to take a call outside the car, to check a text message, search for directions, or if the user has reached her destination—without feeling tethered to one spot, the phone will stop charging. Additionally, once the car engine is turned off, the phone may stop charging. In either of these situations, the phone battery may not have been charged sufficiently such that a call may be lost or the phone cannot be used sufficiently for intended functions when it is separated from a power source.

Additionally, different electronic devices often utilize different connection ports and interfaces such that a single power cord is not compatible with multiple power sources or multiple electronic devices. Accordingly, a tech-savvy consumer, with several electronic devices, will usually have multiple power cords to keep track of for charging all the devices. Even then, the consumer may not always be in a place where a standard power source is readily available, or even if so, may not have the appropriate power cord or adapter available to use with a particular power source or electronic device.

Multi-source adapters are also available on the market for making a power cord compatible with multiple power sources. For example, a power cord with a traditional plug interface for connecting an electronic device to a wall outlet for recharging could exchange the plug with a car charger interface, or an airplane charger interface, or a standard USB interface. However, for such adapter devices, each of the power interfaces is usually a separate piece, and therefore difficult to keep track of when not in use, or, if stored away, may not be readily available when needed. Further, such adapter devices have little benefit away from the power source with which they are compatible. Thus, a car charger adapter is only useful in a car, and typically is left in the car when not needed.

In view of the foregoing, there is a need for a compact portable battery charger that can be used to charge a variety of electronic devices, including but not limited to smart phones, mobile phones, data tablets, music players, cameras, camcorders, gaming units, e-books, Bluetooth® headsets and earpieces, GPS devices, and the like. Additionally, there is a need for such a battery charger that is portable and easily used in various conditions and locations, and with various external power sources, to charge electronic devices, including but not limited to in a house or office, a car, an airplane, a computer, or even on-the-go where no standard power source is readily available, but which is compact and easy to store and/or transport. Accordingly, it is a general object of the present invention to provide a compact portable battery charger that improves upon conventional power chargers currently on the market and that overcomes the problems and drawbacks associated with such prior art chargers.

SUMMARY OF THE INVENTION

In accordance with the present invention, a compact portable battery charger is provided for charging electronic devices. In general, the battery charger may comprise a portable charger housing having a rechargeable battery unit provided therein, at least one power input interface attached to the charger housing and at least one power output interface provided on the charger housing.

The battery charger can be provided with various power input interfaces to connect with various power sources, including U.S. and foreign wall sockets of varying designs, a car charger socket, an airline charger socket, and a USB interface. Preferably, the charger includes multiple input connectors, each capable of attachment to a different power source, thereby eliminating the need for separate adapter pieces. Alternatively, the power charger can utilize interchangeable power input connectors.

The battery charger also includes a power output, preferably in the form of a power output port, such as a USB port. The power output can be combined with a connector cable and an adapter unit to interface with various charging interfaces used on electronic devices, including a USB interface, a micro-USB interface, a mini-USB interface, an AC/DC interface, and the like. The connector cable and adapter unit can comprise interchangeable parts, each adaptable to a different type of connection interface, or alternatively, include several different connection interfaces on the same part—e.g., a squid connector with multiple connectors.

In a first aspect of the present invention, the portable battery charger comprises a charger housing having at least one power input connector interface for connection to a power source and a power output connector interface for connection to an electronic device needing recharging. A rechargeable battery internally disposed within the charger housing and is operably connected with the at least one power input connector interface and the power output connector interface.

In another aspect of the present invention, a portable charger unit for recharging at least one electronic device having a rechargeable internal battery comprises a charger housing internally storing a rechargeable battery, at least one power input interface pivotably connected to the charger housing for movement between an extended position where the at least one interface projects outwardly away from the charger housing for use and a retracted position for storage of the at least one interface within the charger housing, and at least one power output interface. The at least one power input interface is operatively connected to the internal battery for providing an electrical charger from an external power source to the charger unit when the at least one interface is operatively engaged with the power source and for recharging the internal battery when the charger unit is connected to the power source in such a manner. The at least one power output interface is operatively connected to the internal battery for providing an electrical charge from the internal battery to the at least one electronic device when the at least one electronic device is connected to the charger unit via the at least one power output interface.

In embodiments of the present invention, the battery charger includes multiple power input connector interfaces, each adaptable for use with a different power source. For example, an embodiment of the portable charger includes both a wall plug interface for connection to a standard U.S. wall socket and a car charger interface for insertion into a vehicle cigarette lighter and charger socket. The portable charger can include additional charging interfaces, such as an airplane charger interface or a USB interface (male and/or female), and further can used any combination of such power input interfaces.

In preferred embodiments of the present invention, the power input connector interfaces included with the portable charger unit are storable within the charger housing when not in use or when another power input interface is being used. For example, a standard wall plug interface can be pivotably attached to the charger housing. When needed to plug the charger into a standard U.S. wall socket, the plug interface can be pivoted out from its storage cavity so that the charger can be plugged in. Similarly, a car charger interface can be storable within a cavity formed into the charger housing and pivotable out and away from the charger housing to plug the charger into a car charging socket.

Still further, the present invention can utilize a design that permits interchanging of power input connector adapters for use with a variety of standard power sources, including those mentioned above.

In another aspect of the present invention, a portable battery charger may further include a power connection port capable of acting as both a power input and a power output depending on what is connected to the charger unit via the power connection port. Further, the power connection port may act as a power input when the power connection port is connected to an external power source that provides an electrical charger to the charger unit, where said charge is used for recharging the internal battery of the charger unit when the charger unit is connected to the external power source. Similarly, the power connection port may act as a power output when the power connection port is connected to at least one electronic device, and a charge is provided from the internal battery of the charger unit to the electronic device to recharge the internal battery of said electronic device when said electronic device is connected to the charger unit via the power connection port.

In another aspect of the present invention, a portable battery charger may further comprise a processing unit contained within the charger housing, which can keep track of the capacity level of the rechargeable battery unit disposed therein, store data or provide a conduit means by which data can be exchanged between electronic devices, such as between a smart phone and a computer.

In another aspect of the present invention, a power indicator or interface is provided on the charger housing to indicate the power capacity level of the internal rechargeable battery unit. The power interface can comprise a light or series of lights, a digital readout, or other known forms of indicating power level of a battery. Additional indicator means can be utilized in the present invention for various functionalities, including but not limited to indicating that a charge is being provided to an electronic device, either from a standard power source or the internal battery unit of the portable battery charger, or indicating the power level in an electronic device attached to the charger via the power output connector interface.

These and other objects, features and advantages of the present invention will become apparent in light of the detailed description of embodiments thereof, as illustrated in the accompanying drawings.

DETAILED DESCRIPTION OF THE DRAWINGS

Figure 1:
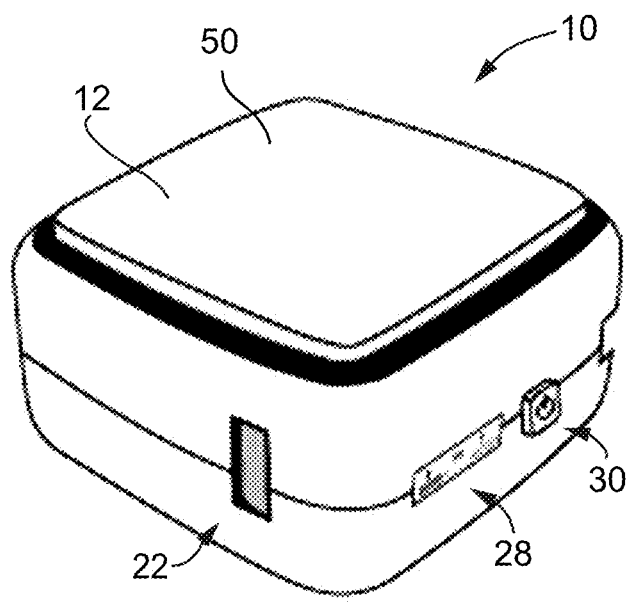
FIG. 1 shows a perspective view of a compact portable battery charger in accordance with a first embodiment of the present invention with power input interfaces stored at respective retracted positions.

A compact portable battery charger in accordance with the present invention, generally designated by reference numeral 10, is shown in FIGS. 1-14 in various operational set-ups. The charger 10 generally comprises a charger housing 12 having an internal portable power bank (e.g., a rechargeable battery unit) provided therein, one or more power input interfaces connected to the charger housing 12 for recharging the power bank, and at least one power output interface provided on the charger housing 12 for charging electronic devices connected to the charger 10, either "on-the-go" from the internal power bank contained within the charger 10 or directly from an external power source to which the charger 10 is connected via a power input interface.

Figure 6:
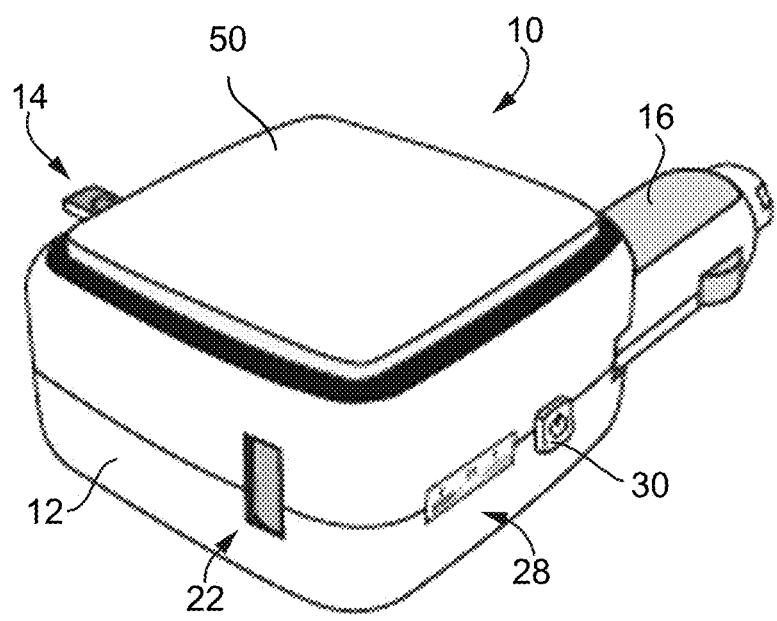
FIG. 6 shows a perspective view of the portable battery charger of FIG. 1 with a wall plug power input interface and a car charger power input interface pivoted to respective extended positions for use in accordance with the present invention.
Figure 7:
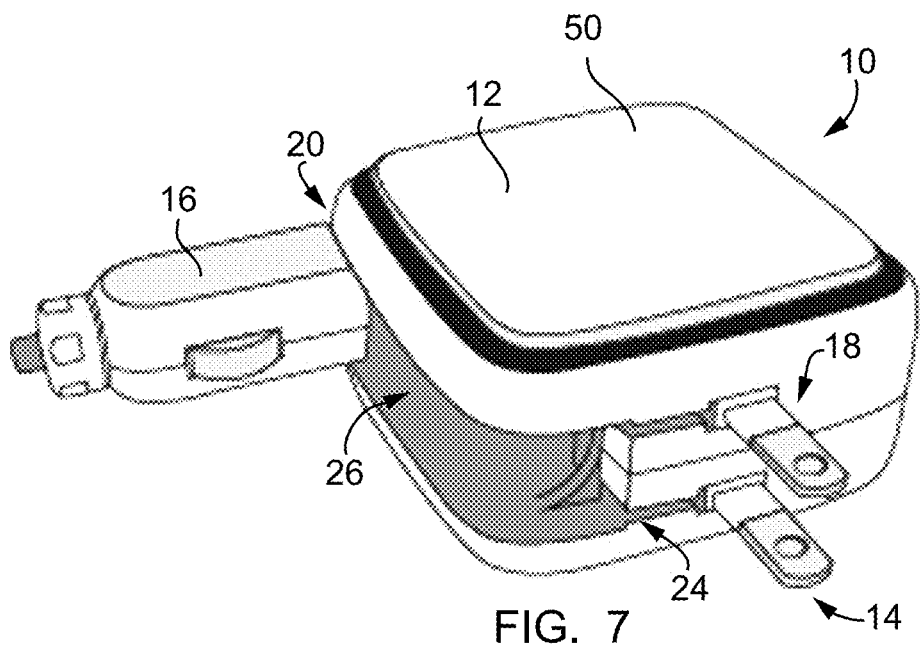
FIG. 7 shows an opposite perspective view of the portable battery charger of FIG. 1 in the condition illustrated in FIG. 6.
Figure 8:
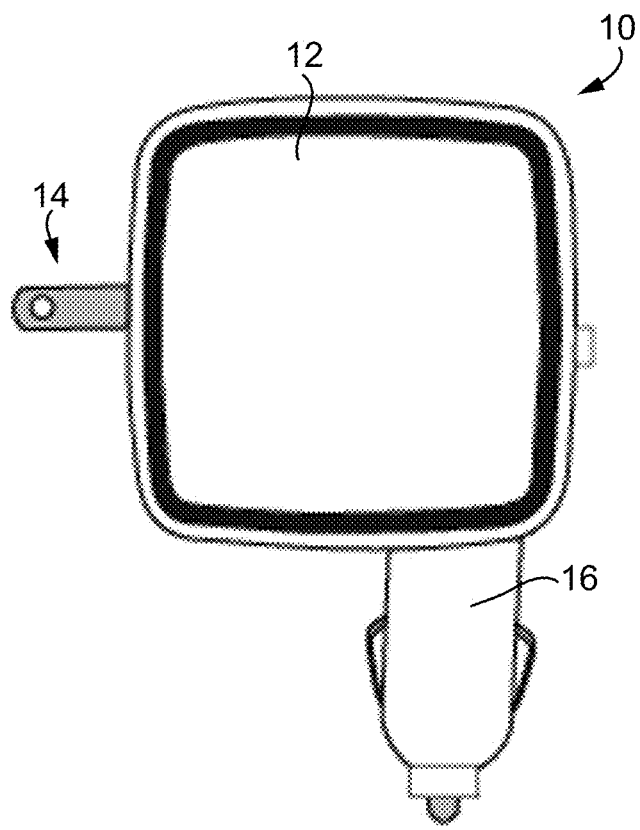
FIG. 8 shows a planar side view of the portable battery charger of FIG. 1 in the condition illustrated in FIG. 6.

In accordance with the present invention, the portable charger 10 preferably includes multiple power input interfaces that can be used when needed, and which increase the versatility of the power charger for use with various power sources, including but not limited to U.S. and foreign wall sockets of varying designs, a car charger socket, an airline charger socket, and a USB interface. As illustrated in FIGS. 6-8, the portable battery charger 10 comprises a charger housing 12 having power input interfaces in the form of a wall plug interface 14 and a car charger interface 16, both pivotally connected to the charger housing 12 at a respective pivot point 18 and 20. When a power input interface is needed to connect the charger 10 to an external power source—for example, to recharge the internal battery unit of the charger 10—it can be individually pivoted out and away from the charger housing 12 to an extended position for connection to the power source. When a power input interface is not needed, it can be moved to its retracted position, preferably contained within the general footprint of the charger housing 12, as shown in the figures and described in more detail below.

A power charger 10 in accordance with the present invention can also be connected to one or more electronic devices for recharging from the internal battery of the charger or directly from an external power source via the portable charger 10. In preferred embodiments, at least one electronic device can be connected to the charger 10 via the power output interface on the charger housing 12, for example, using a connector cable inserted into the power output interface, which comprises a USB connection port 22 in the embodiment illustrated in FIG. 1. The connector cable can be further combined with an adapter unit to interface with various charging interfaces used on electronic devices, including for example a USB interface, a mini-USB interface, a micro-USB interface, an AC/DC interface, and the like. Such an output adapter unit can comprise interchangeable parts, each adaptable to a different type of interface, or alternatively, the portable power charger can be adapted for use with an adapter comprising multiple different interfaces on the same part—e.g., a squid connector with multiple connectors. Still further, the charger housing 12 can include connectors attached to the charger housing 12 and preferably stored within the housing 12 when not in use, but extendable from the housing 12 for connection with electronic devices for recharging, such as the designs described and illustrated in co-pending U.S. application Ser. No. 13/571,992, filed Aug. 10, 2012, which shares common inventors with the present application and which is incorporated herein by reference.

Figure 2:
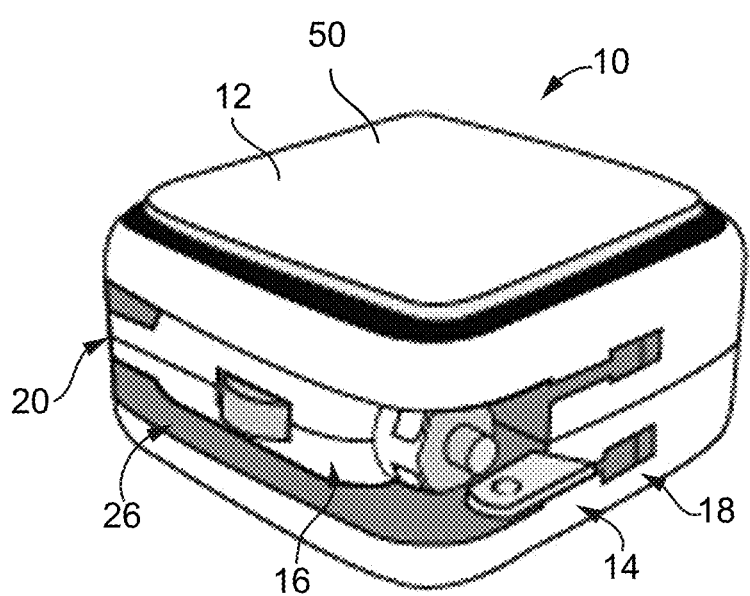
FIG. 2 shows an opposite perspective view of the portable battery charger of FIG. 1.

The power charger 10 in accordance with the present invention can be connected to an external power source to recharge the internal battery unit, or provide a charging conduit between the power source and an electronic device connected to the charger 10. In this regard, the charger 10 acts both as a portable power charger and as a power adapter for recharging electronic devices. As shown in FIGS. 1-2, 6-7, 9-10 and 12-13, the plug interface 14 and the car charger interface 16 are each preferably independently pivotable to a respective extended position where they can be connected to a respective power source as needed. When a power input interface is not needed, it can be moved to a retracted position and stored within a storage cavity formed within the charger housing 12, such as wall plug cavity 24 illustrated in FIG. 10 and car charger cavity 26 illustrated in FIG. 13, each defined, in part, by a first side wall 50 and an opposing second side wall 52. The cavities 24 and 26 preferably having complementary shapes to the particular interfaces housed therein to efficiently store the interface without compromising the shape and size of the charger housing 12. Thus, when a power input interface is not in use, it can be kept in a retracted storage condition where it is preferably contained within the general footprint of the charger housing 12 and disposed between the opposing first and second side walls 50 and 52. Alternately, or additionally, the wall plug interface 24 and the car charger interface 26 can be housed within a common cavity formed in the charger housing 12 and defined between the opposing first and second side walls 50 and 52, as generally illustrated in FIG. 2, and be disposed in respective retracted positions within said common cavity without interfering with movement of the other interface to its respective extended position. In this regard, the size of the charger housing 12 can be reduced to provide a compact power charger that is easy to use, store and transport. By storing the power input interfaces within the general footprint of the charger housing 12, the power input interfaces do not interfere with use, storage and transport of the charger unit 10—for example, a properly stored input interface does not get snagged on anything during use, storage or transport of the charger unit 10 or interfere with or tangle with connector cables that may be attached to the charger unit 10 to charge an electronic device from the internal battery of the unit 10.

As shown, in FIGS. 1-5, the plug interface 14 and the car charger interface 16 are pivoted to respective storage conditions where they are preferably stored within the footprint of the charger housing 12 yet easily pivoted to a use condition when necessary. This condition of the charger 10 is generally used when a power input interface is not needed—i.e., the internal battery unit is charged and the charger 10 is available for portable use as a power charger for other electronic devices. It is advantageous for "on-the-go" use to have the power input interfaces contained within the general footprint of the charger housing 12 so that they do not interfere with use, transportation or storage of the charger 10, or do not unnecessarily increase the size of the charger 10, since a compact but powerful and versatile portable power bank is desirable.

Figure 9:
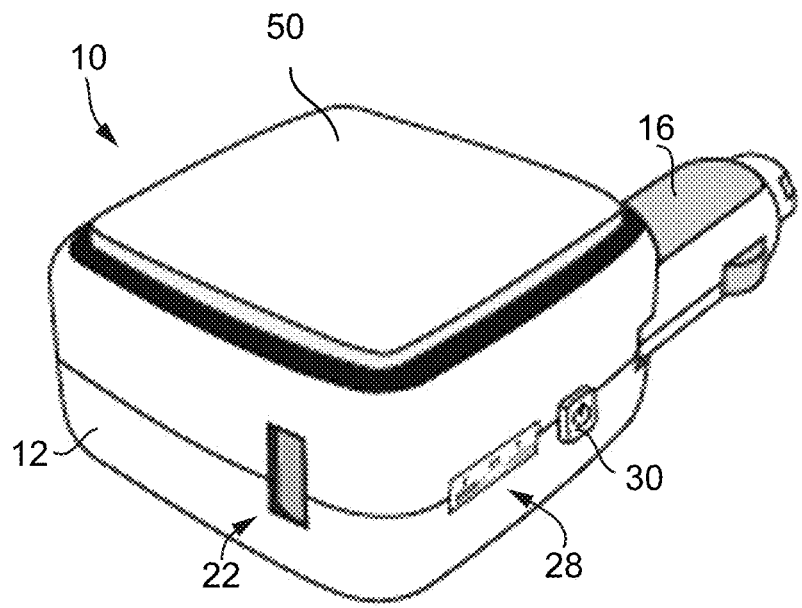
FIG. 9 shows a perspective view of the portable battery charger of FIG. 1 with a car charger power input interface pivoted to an extended position for use in accordance with the present invention.
Figure 10:
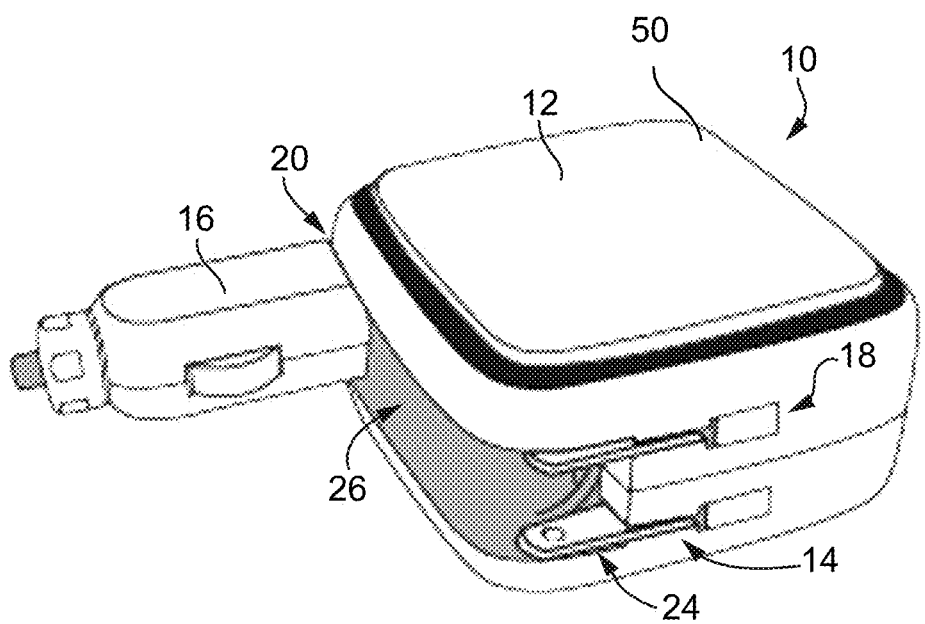
FIG. 10 shows an opposite perspective view of the portable battery charger of FIG. 1 in the condition illustrated in FIG. 9.
Figure 11:
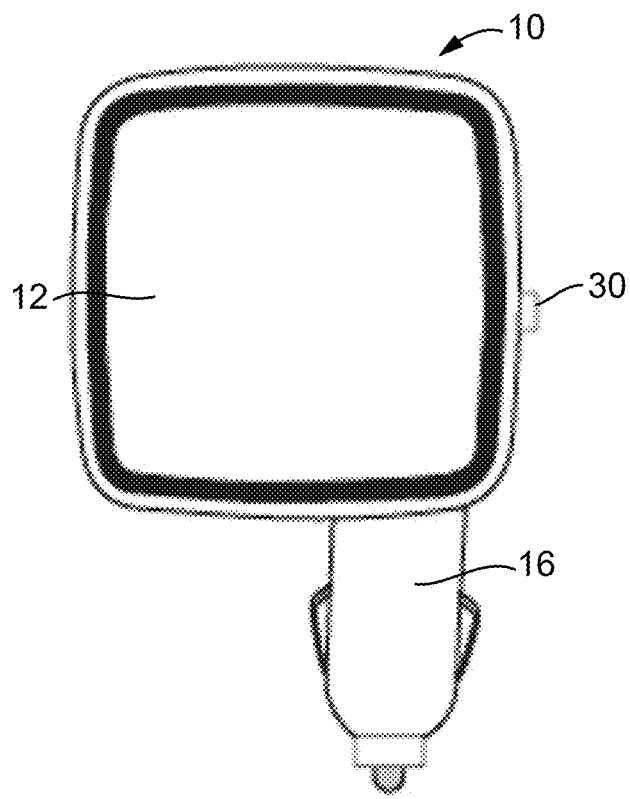
FIG. 11 shows a planar side view of the portable battery charger of FIG. 1 in the condition illustrated in FIG. 9.
Figure 12:
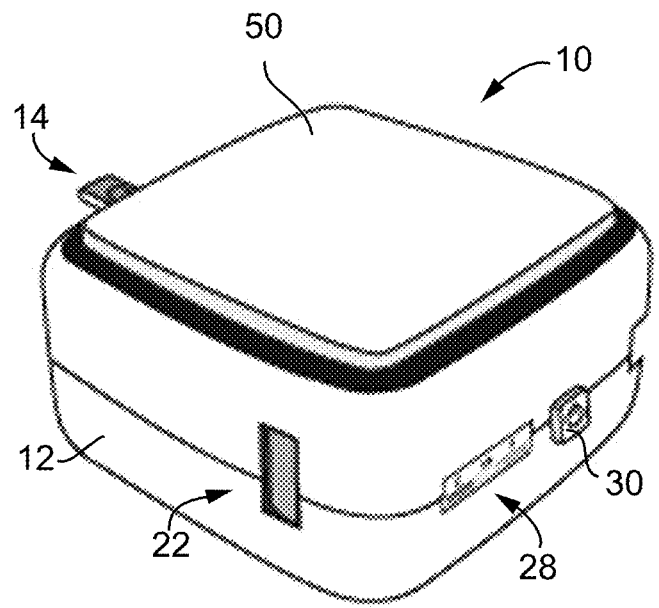
FIG. 12 shows a perspective view of the portable battery charger of FIG. 1 with a wall plug power input interface pivoted to an extended position for use in accordance with the present invention.
Figure 13:
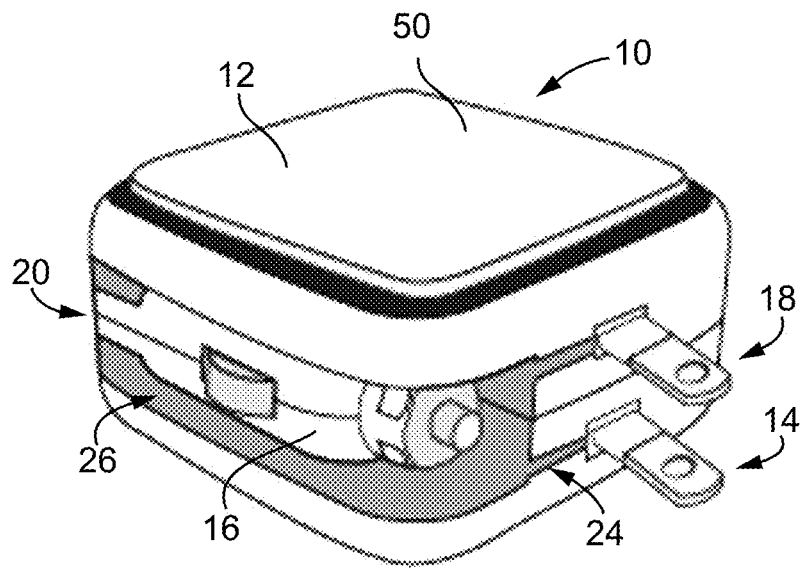
FIG. 13 shows an opposite perspective view of the portable battery charger of FIG. 1 in the condition illustrated in FIG. 12.
Figure 14:
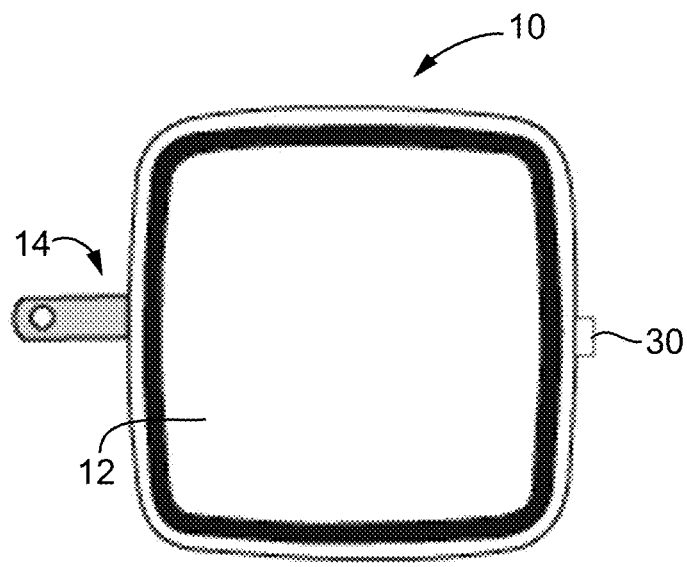
FIG. 14 shows a planar side view of the portable battery charger of FIG. 1 in the condition illustrated in FIG. 12.

Referring to FIGS. 6-8, both the plug interface 14 and the car charger interface 16 are shown in their respective extended positions. Referring to FIGS. 9-11, only the car charger interface 16 is in its extended position, while the plug interface 14 is maintained at its retracted position contained within the general footprint of the charger housing 12. Referring to FIGS. 12-14, only the plug interface 14 is in its extended position, while the car charger interface 16 is maintained at its retracted position contained within the general footprint of the charger housing 12. In this regard, the wall plug interface 14 and the car charger interface 16 are each selectively movable to a respective extended position for use as a power input interface independent of the other interface.

As noted, the charger 10 can include additional power input interfaces in addition or in lieu of the illustrated plug and car charger interfaces 14 and 16, including, but not limited to an airplane charge interface, foreign plug designs, a USB interface, both male and female, and the like. In this regard, the present invention can use various combinations of interfaces to improve the versatility of the charger 10 for recharging in a variety of locations and environments.

Figure 5:
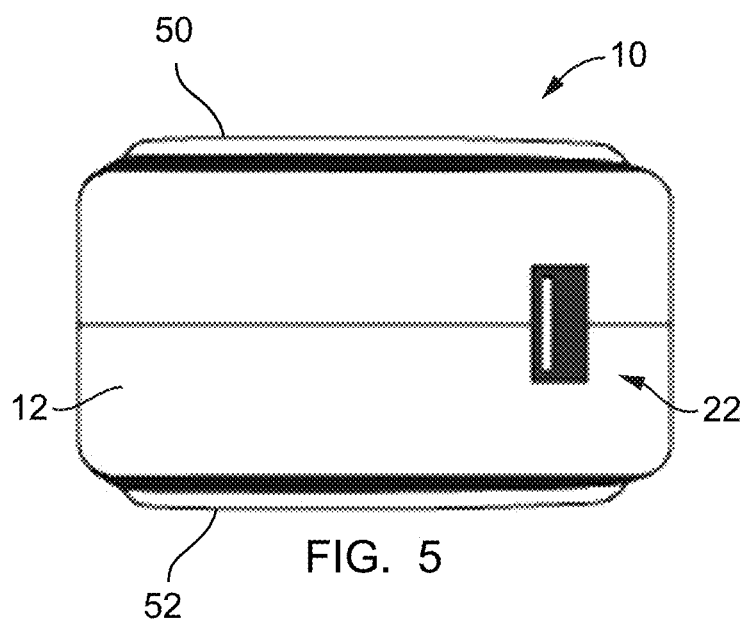
FIG. 5 shows another planar end view of the portable battery charger of FIG. 1.

Referring to FIG. 5, the power output connector interface comprises a standard USB port 22 into which a connector cable can be inserted for recharging one or more electronic device connected to the other end of the cable. More specifically, the connector cable can utilize various interface connector designs and interchangeable connector adapters, each adaptable to a different type of interface, or comprise multiple different interfaces usable as necessary (such as a squid connector). Where the connector cable comprises multiple different interfaces, the portable battery charger 10 can be used to charge multiple electronic devices at the same time, either directly from a standard power source to which the charger 10 is connected, or from the internal rechargeable battery unit disposed within the power charger 10.

Additionally, a USB port, such as port 22 shown in FIG. 5, or other connection port can be used to connect the power charger 10 to a desired adapter for use with any complementary external power source. Thus, where the charger 10 only includes a wall plug interface 14 and a car charger interface 16 for power input interfaces, as shown in other figures, for example, the USB port 22 can be used to connect to a different power source, such as a computer via a connector cable. In this regard, the USB connection port 22 can comprise a two-way charging interface, such as described and illustrated in co-pending U.S. application Ser. No. 13/682,985, filed Nov. 21, 2012, which shares common inventors with the present application and which is incorporated herein by reference. In this mode of operation, the charger 10 can be simultaneously connected to an external power source for recharging the internal battery unit of the charger 10 and one or more electronic devices being recharged either from the charger's internal battery or directly from the external power source.

In preferred embodiments of the present invention, the rechargeable battery unit is disposed within the charger housing 12. The rechargeable battery unit is operatively connected with the power input connector interface(s) provided with the charger housing 12 for recharging the battery when the charger 10 is connected to an external power source. The rechargeable battery is also operatively connected with the power output connector interface 22 for recharging electronic devices connected to the power charger 10 from the rechargeable battery unit. In preferred embodiments, the battery unit comprises a rechargeable Lithium-Ion battery.

The power charger 10 also includes various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

The power charger 10 also comprises a controller, including a processing unit, configured to execute instructions and to carry out operations associated with the power charger 10. For example, the processing unit can keep track of the capacity level of the battery unit, store data or provide a conduit means by which data can be exchanged between electronic devices, such as between a smart phone and a computer. The processing unit communicates with the battery unit to determine how much capacity is remaining in the battery. Upon determining the capacity level, the processing unit can communicate with a power indicator means 28 to provide the user with information for how much capacity is remaining in the internal rechargeable battery unit and whether the charger 10 needs to be connected to an external power source for recharging.

The processing unit also includes a smart interface to determine the total current required for specific devices connected to the power charger. In this regard, the processing unit operates in connection with input/output (I/O) support circuitry to control interactions with devices connected to the power charger. The I/O support circuitry may be integrated with the processing unit or may be a separate component. Generally, the I/O support circuitry operates by exchanging power (and possibly data) between the power charger and electronic devices connected thereto via the power output connector interface.

The processing unit further includes a storage unit that provides a place to hold data or instructions for operation of the power charger and rechargeable battery unit, or data exchanged between the power charger 10, a computer, and electronic devices connected to the power charger 10, or memory needed for further operations of the power charger 10.

The USB connection port 22 of the power charger 10, described above for connecting additional devices to the portable battery charger 10 for recharging, can also be used for data exchange, without departing from the principles and spirit of the present invention.

The power charger 10 is readily portable as a result of the small size and increased portability by storing the power input interfaces within the footprint of the charger housing when not in use. Despite the small size of the power charger 10, the power capacity is very high so that the battery unit can accommodate multiple electronic devices at the same time, if necessary.

In accordance with intended operation of the portable power charger 10, a user can recharge one or more electronic devices using the internal rechargeable battery unit, a computer, a wall socket, a car power socket, or an airplane power socket. For example, the portable power charger 10 of the present invention can be used to charge smart phones, mobile phones, data tablets, music players, cameras, camcorders, gaming units, e-books, Bluetooth® headsets and earpieces, GPS devices, and the like. In operation, the rechargeable battery unit can be recharged by connecting the power charger 10 to an external power source, such as a computer, a wall socket, a car or an airplane, either using power input connecter interfaces provided with the charger or via an alternate power connection interface (e.g., USB port 22) permitting connection to the charger 10 via a connector cable and an appropriate adapter or connector interface. At the same time, an electronic device can be simultaneously connected to the power charger 10 via the power output connector interface. When the power charger 10 is connected to an external power source, the electronic device will be typically recharged directly from the external power source. This can be done at the same time as when the rechargeable battery unit inside the power charger 10 is being recharged. When the power charger 10 is disconnected from the external power source, the rechargeable battery unit can be used to recharge an electronic device connected to the power output interface of the charger 10, which is especially useful for on-the-go use of an electronic device, or when the user needs to recharge an electronic device where no external power source is readily accessible.

Figure 4:
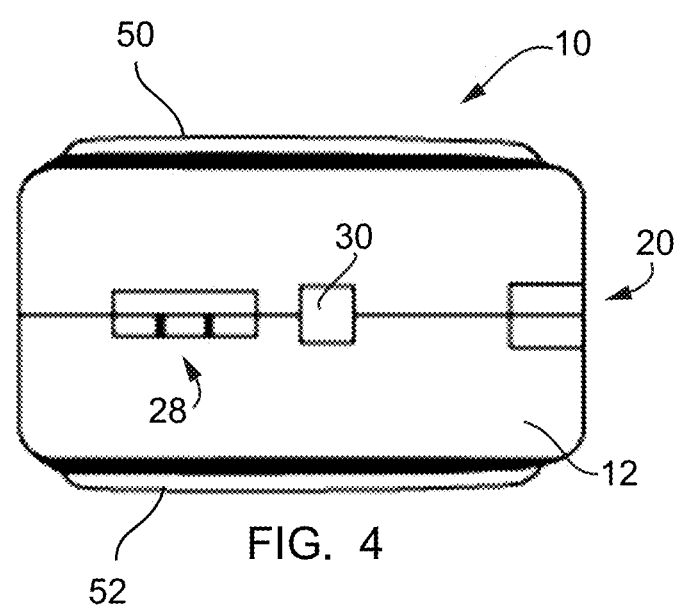
FIG. 4 shows a planar end view of the portable battery charger of FIG. 1.

Referring to FIG. 4, the portable power charger 10 also includes a power indicator means 28 that will indicate not only that an electrical current is being supplied to an electronic device connected to the power output connector interface, but also the remaining capacity of the internal rechargeable battery unit in the power charger 10. For example, in an embodiment of the present invention, the power indicator means 28 comprises a series of lights, but can include more or fewer lights without departing from the principles and spirit of the present invention. When the battery is at full capacity, all the lights will be lit up. As the battery power decreases, the lights will correspondingly decrease by one as the power is used. If there is no capacity left in the internal battery, none of the lights will be lit up or a light corresponding to an "empty" indication will be lit up. Alternatively, the power indicator means 28 can comprise a digital interface that provides a battery capacity level for the internal rechargeable battery unit, or another known means of providing battery level information.

The processing unit of the power charger 10, which can keep track of the capacity level of the internal rechargeable battery unit, store data or provide a conduit means by which data can be exchanged between electronic devices, such as between a smart phone and a computer, communicates with the battery unit to determine how much capacity is remaining in the battery. Upon determining the capacity level, the processing unit communicates with the power indicator means 28 to provide the user with the appropriate signal and information for showing how much capacity is remaining in the internal battery.

The processing unit may also include a smart interface to determine the total current required for the specific electronic devices connected to the battery charger 10. Additionally, the battery charger 10 may comprise an internal switch to draw power from the rechargeable battery unit or essentially turn off the battery unit. For example, the processing unit can determine if the power charger 10 is connected to an external power source. If so, when an electronic device is also connected to the power charger 10, the processing unit can ensure that the electronic device is being charged directly from the external device instead of drawing power from the rechargeable battery unit as it is being recharged itself. Further, the processing unit can determine when the power charger 10 is disconnected from an external power source, and if still connected to an electronic device, sufficiently switch the internal circuitry of the battery charger 10 so that the electronic device continues to be recharged from the rechargeable battery unit without delay.

The processing unit also preferably includes a timer for automatically turning the battery charger 10 off if there is no device attached to the power charger 10 for a predetermined period of time, or if any device still attached to the power charger 10 has reached maximum capacity. In this regard, the capacity of the internal rechargeable battery in the power charger 10 can be preserved. Upon shut down of the power charger 10, the power indicator means 28 will indicate that the power charger 10 is being turned off—for example, the lights will provide a sequential blinking signal.

Additional indicator means can be utilized in the present invention for various functionalities, including but not limited to indicating that a charge is being provided to an electronic device, either from a standard external power source or from the internal rechargeable battery unit of the portable power charger 10, or indicating the power level in an electronic device attached to the power charger 10 via the power output connector interface 22.

Referring again to FIG. 4, the charger housing 12 is also provided with a power control interface 30 for turning the charger on and off. As shown, the power control interface 30 comprising a manual on/off button. In alternate embodiments, the charger 10 can utilize an automatic power on and power off protocol, such as described above and in co-pending U.S. application Ser. No. 13/682,985, incorporated herein by reference. Still further, the charger 10 can be provided with such an automatic on/off protocol, yet still include a manual power button or switch (e.g., button 30) for additional control over use of the charger 10.

Figure 3:
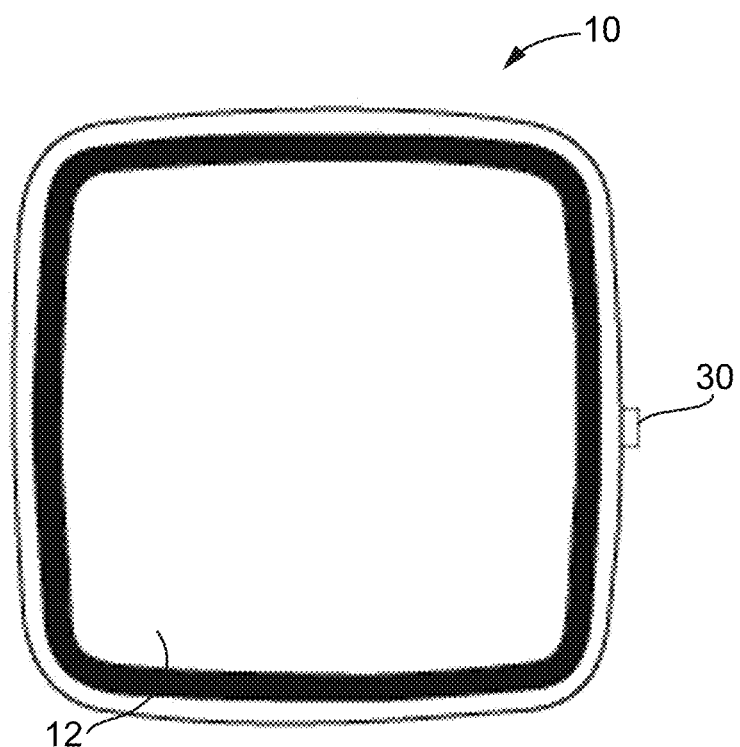
FIG. 3 shows a planar side view of the portable battery charger of FIG. 1.

In accordance with the present invention, the charger housing 12 can have a small size to increase the portability and versatility of the power charger 10. As shown in FIGS. 3-5, when the power input interfaces 14 and 16 are stored within their respective cavities 24 and 26, they can be fully disposed within the footprint of the charger housing 12, such as further illustrated in FIG. 1. Moreover, each power input interface 14 or 16 can be selectively pivoted out from the charger housing 12 for use without disrupting or needing to move the other interface, such as just needing the car charger interface 16, as shown in FIGS. 9-11, while the plug interface 14 remains retracted, or just needing the plug interface 14, as shown in FIGS. 12-14, while the car charger interface 16 remains retracted. The cavities 24 and 26 are open so as to permit easy and quick extension of the interfaces 14 and 16 to a use condition, as needed.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable charger unit for recharging at least one electronic device having a rechargeable internal battery, said portable charger unit comprising:

a charger housing internally storing a rechargeable battery and defining a first side wall and an opposing second side wall said first and second side walls being generally parallel to one another:

a wall plug interface operatively connected to the charger housing and configured for engagement with a wall socket said wall plug interface being pivotably connected to the charger housing for movement between an extended position where said wall plug interface projects outwardly away from the charger housing for use and a retracted position for storage of said wall plug interface within the charger housing, said wall plug interface being operatively connected to the internal battery for providing an electrical charge from an external power source to the charger unit when said wall plug interface is operatively engaged with said power source and for recharging the internal battery when the charger unit is connected to said power source in said manner;

a car charger interface operatively connected to the charger housing and configured for engagement with a car charger socket said car charger interface being pivotably connected to the charger housing for movement between an extended position where said car charger interface projects outwardly away from the charger housing for use and a retracted position for storage of said car charger interface within the charger housing, said car charger interface being operatively connected to the internal battery for providing an electrical charge from an external power source to the charger unit when said car charger interface is operatively engaged with said power source and for recharging the internal battery when the charger unit is connected to said power source in said manner: and at least one power output interface operatively connected to the internal battery for providing an electrical charge from the internal battery to said at least one electronic device when said at least one electronic device is connected to the charger unit via the at least one power output interface, wherein both the wall plug interface and the car charger interface are independently pivotable to respective retracted positions, such that, when said wall plug interface and said car charger interface are in their respective retracted positions, each is disposed within a common cavity formed solely within the charger housing and defined, in part, by the first and second opposing side walls of the charger housing so that both said interfaces are contained and disposed within the general voluminal footprint of the charger housing, so that the first and second opposing side walls of the charger housing enclose both the wall plug interface and the car charger interface when in said retracted positions.

2. The portable charger unit according to claim 1, wherein the cavity for the wall plug interface and the cavity of the car charger interface form a common cavity formed within the charger housing such that said wall plug interface and said car charger interface are stored within said common cavity formed within the charger housing and can be simultaneously disposed in respective retracted positions within said common cavity without interfering with movement of the other interface to its respective extended position.

3. The portable charger unit according to claim 2, wherein the wall plug interface and the car charger interface are each selectively movable to a respective extended position for use as a power input interface independent of the other interface.

4. A portable charger unit for recharging at least one electronic device having a rechargeable internal battery, said portable charger unit comprising:

a charger housing internally storing a rechargeable battery and defining a first side wall and an opposing second side wall, said first and second side wall being generally parallel to one another;

at least two power input interfaces, each pivotably connected to the charger housing for independent movement between an extended position where each said interface projects outwardly away from the charger housing for use and a retracted position for storage of said interface within the charger housing, each said one power input interface being operatively connected to the internal battery for providing an electrical charge from an external power source to the charger unit when said interface is operatively engaged with said power source and for recharging the internal battery when the charger unit is connected to said power source in said manner; and at least one power output interface operatively connected to the internal battery for providing an electrical charge from the internal battery to said at least one electronic device when said at least one electronic device is connected to the charger unit via the at least one power output interface, wherein the at least one power output interface comprises a power connection port configured for connection with a power input interface of said at least one electronic device; and wherein the power connection port is capable of acting as a power input and a power output depending on what is connected to the charger unit via the power connection port, wherein said at least two power input interfaces are stored within a common cavity formed solely within the charger housing and defined, in part, by two opposing faces of the charger housing, wherein said at least two power input interfaces are simultaneously disposed in respective retracted positions within said common cavity without interfering with movement of the other interface to its respective extended position, and wherein said at least two power input interfaces retract towards each other.

5. The portable charger unit according to claim 4, wherein said power connection port acts as a power input when the power connection port is connected to an external power source that provides an electrical charge to the charger unit, and said charge is used for recharging the internal battery when the charger unit is connected to said power source via the power connection port; and wherein said power connection port acts as a power output when the power connection port is connected to the at least one electronic device, and a charge is provided from the internal battery of the charger unit to the electronic device to recharge the internal battery of said electronic device when said electronic device is connected to the charger unit via the power connection port.

6. The portable charger unit according to claim 1, further comprising power indicator means provided on the charger housing for indicating the power capacity level of the internal battery.

7. A portable charger unit for recharging at least one electronic device having a rechargeable internal battery, said portable charger unit comprising:

a charger housing internally storing a rechargeable battery; a wall plug interface configured for engagement with a wall socket and being operatively connected to the internal battery for providing an electrical charge from said wall socket to the charger unit when said wall plug interface is operatively engaged with said wall socket and for recharging the internal battery when the charger unit is connected to said wall socket in said manner, said wall plug interface being pivotably connected to the charger housing for movement between an extended position where said wall plug interface projects outwardly away from the charger housing for use and a retracted position for storage of said wall plug interface within the charger housing;

a car charger interface configured for engagement with a car charger socket and being operatively connected to the internal battery for providing an electrical charge from said car charger socket to the charger unit when said car charger interlace is operatively engaged with said car charger socket and for recharging the internal battery when the charger unit is connected to said car charger socket in said manner, said car charger interface being pivotably connected to the charger housing for movement between an extended position where said car charger interface projects outwardly away from the charger housing for use and a retracted position for storage of said car charger interface within the charger housing; and at least one power output interlace operatively connected to the internal battery for providing an electrical charge from the internal battery to said at least one electronic device when said at least one electronic device is connected to the charger unit via the at least one power output interface, wherein said wall plug interface and said car charger interface are stored within a common cavity formed solely within the charger housing and defined, in part, by two opposing faces of the charger housing, wherein said wall plug interface and said car charger interlace are simultaneously disposed in respective retracted positions within said common cavity without interfering with movement of the other interface to its respective extended position, and wherein said wall plug interface and said car charger interface retract towards each other.

8. The portable charger unit according to claim 7, wherein the wall plug interface, in its retracted position, is disposed within the common cavity formed in the charger housing so that said wall plug interface is contained within the general voluminal footprint of the charger housing when not in use.

9. The portable charger unit according to claim 7, wherein the car charger interface, in its retracted position, is disposed within the common cavity formed in the charger housing so that said car charger interface is contained within the general voluminal footprint of the charger housing when not in use.

10. The portable charger unit according to claim 7, wherein the wall plug interface, in its retracted position, is disposed within the common cavity formed in the charger housing so that said wall plug interface is contained within the general voluminal footprint of the charger housing when not in use; and wherein the car charger interface, in its retracted position, is disposed within the common cavity formed in the charger housing so that said car charger interface is contained within the general voluminal footprint of the charger housing when not in use.

11. The portable charger unit according to claim 7, wherein the wall plug interface and the car charger interface are each selectively movable to a respective extended position for use as a power input interface independent of the other interface.

12. The portable charger unit according to claim 7, wherein the at least one power output interface comprises a power connection port configured for connection with a power input interface of said at least one electronic device.

13. The portable charger unit according to claim 12, wherein the power connection port is capable of acting as a power input and a power output depending on what is connected to the charger unit via the power connection port.

14. The portable charger unit according to claim 13, wherein said power connection port acts as a power input when the power connection port is connected to an external power source that provides an electrical charge to the charger unit, and said charge is used for recharging the internal battery when the charger unit is connected to said power source via the power connection port; and wherein said power connection port acts as a power output when the power connection port is connected to the at least one electronic device, and a charge is provided from the internal battery of the charger unit to the electronic device to recharge the internal battery of said electronic device when said electronic device is connected to the charger unit via the power connection port.

15. The portable charger unit according to claim 7, further comprising power indicator means provided on the charger housing for indicating the power capacity level of the internal battery.

* * * * *